(12) United States Patent
Popovic

(10) Patent No.: US 9,369,271 B2
(45) Date of Patent: *Jun. 14, 2016

(54) METHOD FOR IMPROVING SYNCHRONIZATION AND INFORMATION TRANSMISSION IN A COMMUNICATION SYSTEM

(71) Applicant: Huawei Technologies Co., Ltd., Shenzhen, Guangdong (CN)

(72) Inventor: Branislav Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,478

(22) Filed: Oct. 24, 2014

(65) Prior Publication Data

US 2015/0103935 A1    Apr. 16, 2015

Related U.S. Application Data

(63) Continuation of application No. 13/365,957, filed on Feb. 3, 2012, which is a continuation of application No. 12/175,632, filed on Jul. 18, 2008, now Pat. No. 8,139,663, which is a continuation of application No. PCT/CN2006/000076, filed on Jan. 18, 2006.

(51) Int. Cl.
 *H04K 1/10* (2006.01)
 *H04L 27/28* (2006.01)
 (Continued)

(52) U.S. Cl.
 CPC ............ *H04L 7/043* (2013.01); *H04L 27/2613* (2013.01); *H04L 27/2626* (2013.01); *H04L 27/2655* (2013.01); *H04L 27/2675* (2013.01); *H04L 7/041* (2013.01)

(58) Field of Classification Search
 CPC . H04L 27/2655; H04L 27/2613; H04L 7/041; H04L 7/043; H04L 27/2675; H04L 27/2626
 USPC ................. 375/260, 343, 146, 149, 362, 340; 370/208, 344
 See application file for complete search history.

(56) References Cited

U.S. PATENT DOCUMENTS

| 6,618,452 B1 | 9/2003 | Huber et al. |
| 6,839,876 B1 | 1/2005 | Tong et al. |

(Continued)

FOREIGN PATENT DOCUMENTS

| CN | 1308427 A | 8/2001 |
| CN | 1599367 A | 3/2005 |

(Continued)

OTHER PUBLICATIONS

Kwon et al., "Preamble Structure for Single Frequency Cellular Systems Using Orthogonal Frequency Division Multiplexing," IEEE Transactions on Consumer Electronics, vol. 50, No. 1, Institute of Electrical and Electronics Engineers, New York, New York (Feb. 2004).

(Continued)

*Primary Examiner* — Phuong Phu
(74) *Attorney, Agent, or Firm* — Leydig, Voit & Mayer, Ltd.

(57) ABSTRACT

A method is provided for improving synchronization and information transmission in a communication system, including: generating a signal with a centrally symmetric part s(k) exploitable for synchronization; and sending the signal over a communication channel. The signal is based on a uniquely identifiable sequence c(l) from a set of sequences exploitable for information transmission. The centrally symmetric part s(k) is centrally symmetric in the shape of absolute value thereof. The centrally symmetric part s(k) is of arbitrary length N.

16 Claims, 7 Drawing Sheets

(51) Int. Cl.
*H04L 7/04* (2006.01)
*H04L 27/26* (2006.01)

(56) References Cited

U.S. PATENT DOCUMENTS

| | | | |
|---|---|---|---|
| 6,922,388 | B1 | 7/2005 | Laroia et al. |
| 7,251,490 | B2 | 7/2007 | Rimoni |
| 7,313,085 | B2 * | 12/2007 | Kim .............................. 370/208 |
| 7,570,684 | B2 | 8/2009 | Zhang et al. |
| 7,664,165 | B2 | 2/2010 | Kang et al. |
| 7,706,458 | B2 | 4/2010 | Mody et al. |
| 7,746,916 | B2 | 6/2010 | Han et al. |
| 7,751,490 | B2 | 7/2010 | Popovic |
| 8,116,195 | B2 | 2/2012 | Hou et al. |
| 8,139,663 | B2 * | 3/2012 | Popovic ......................... 375/260 |
| RE44,351 | E | 7/2013 | Han et al. |
| 2002/0094050 | A1 | 7/2002 | Usui et al. |
| 2003/0026295 | A1 * | 2/2003 | Baum et al. ................... 370/503 |
| 2003/0072256 | A1 | 4/2003 | Kim |
| 2003/0198310 | A1 | 10/2003 | Fanson et al. |
| 2007/0014272 | A1 * | 1/2007 | Palanki et al. ................ 370/344 |
| 2008/0318567 | A1 | 12/2008 | Popovic et al. |
| 2009/0219802 | A1 | 9/2009 | Han et al. |
| 2009/0323642 | A1 | 12/2009 | Tanno et al. |
| 2010/0034305 | A1 | 2/2010 | Popovic |
| 2010/0220695 | A1 | 9/2010 | Han et al. |
| 2011/0188465 | A1 | 8/2011 | Han et al. |
| 2014/0376505 | A1 | 12/2014 | Popovic et al. |

FOREIGN PATENT DOCUMENTS

| | | |
|---|---|---|
| CN | 1691659 A | 11/2005 |
| EP | 0915597 A1 | 5/1999 |
| EP | 1124348 A2 | 8/2001 |
| EP | 1126673 A2 | 8/2001 |
| EP | 1662736 A2 | 5/2006 |
| EP | 1739911 A2 | 1/2007 |
| EP | 1980030 B1 | 8/2010 |
| JP | 2001333041 A | 11/2001 |
| JP | 2001333043 A | 11/2001 |
| JP | 2002518880 A | 6/2002 |
| JP | 2002261728 A | 9/2002 |
| JP | 2005534268 A | 11/2005 |
| JP | 2006054540 A | 2/2006 |
| JP | 2006166436 A | 6/2006 |
| JP | 2007013982 A | 1/2007 |
| JP | 2007221743 A | 8/2007 |
| JP | 2008508803 A | 3/2008 |
| JP | 2009516416 A | 4/2009 |
| JP | 2009517915 A | 4/2009 |
| JP | 2009519670 A | 5/2009 |
| JP | 2009524300 A | 6/2009 |
| JP | 2010517452 A | 5/2010 |
| JP | 2010517452 T | 5/2010 |
| JP | 4976420 B2 | 7/2012 |
| WO | WO 9965180 A2 | 12/1999 |
| WO | 2004023691 A1 | 3/2004 |
| WO | WO 2006015108 A2 | 2/2006 |
| WO | WO 2007082408 A1 | 7/2007 |
| WO | WO 2008134976 A1 | 11/2008 |

OTHER PUBLICATIONS

Swarztrauber, "Symmetric FFTs," Mathematics of Computation, vol. 47, No. 175 pp. 323-346, American Mathematical Society, Providence, Rhode Island (Jul. 1986).
"3rd Generation Partnership Project; Technical Specification Group Radio Access Network; Physical Layer Aspects for Evolved UTRA(Release 7)," 3GPP TR 25.814, V1.0.1, pp. 1-72, 3rd Generation Partnership Project, Valbonne, France (Nov. 2005).
"TP for Downlink Synchronization Channel Schemes for E-UTRA," 3GPP TSG-RAN1 WG1 #42bis, San Diego, California, R1-051072, 3rd Generation Partnership Project, Valbonne, France (Oct. 10-14, 2005).
Zhuang et al., "GCL-based preamble design for 1024,512 and 128 FFT sizes in the OFDMA PHY layer," IEEE 802.16 Broadband Wireless Access Working Group, IEEE C80216e-04/241r1, pp. 1-29, Institute of Electrical and Electronics Engineers, New York, New York (Aug. 29, 2004).
Zhang et al., "Frequency offset estimation with fast acquisition in OFDM system," IEEE Communication Letters, vol. 8, Issue 3, pp. 171-173, Institute of Electrical and Electronics Engineers, New York, New York (Mar. 2004).
"3rd Generation Partnership Project; Technical Specification Group Radio Access Network; Physical channels and mapping of transport channels onto physical channels (FDD)(Release 6)," 3GPP TS 25.211, V6.0.0, 3rd Generation Partnership Project, Valbonne, France (Dec. 2003).
"Search procedure for initial synchronization and neighbour cell identification," 3GPP TSG RAN WG1 Meeting #43,Seoul, Korea, R1-0514127, 3rd Generation Partnership Project, Valbonne, France (Nov. 7-11, 2005).
"Comparing of Two Downlink Synchronization Channel Schemes for E-UTRA," 3GPP TSG-RAN1 WG1 #43, Seoul, Korea, R1-051357, 3rd Generation Partnership Project, Valbonne, France (Nov. 7-11, 2005).
"Physical Channel Concept for Scalable Bandwidth in Evolved UTRA Downlink," 3GPP TSG RAN WG1 #42 on LTE, London, United Kingdom, R1-050706, 3rd Generation Partnership Project, Valbonne, France (Aug. 29-Sep. 2, 2005).
"Basic Structure of Control Channel and Synchronization Channel for Scalable Bandwidth in Evolved UTRA Downlink," TSG-RAN WG1 #42bis, San Diego, California, R1-051147, 3rd Generation Partnership Project, Valbonne, France (Oct. 10-14, 2005).
"Information Technology; Telecommunications and Information Exchange Between Systems; LAN/MAN Specific Requirements; Air Interface for Fixed Broadband Wireless Access Systems," IEEE WirelessMAN 802.16, 802.16.1-00/01r4, Institute of Electrical and Electronics Engineers, New York, New York (Sep. 2000).
Golay, "Complementary Series," IRE Transactions on Information Theory, pp. 82-87 (Apr. 1961).
"CDMA: PN Sequences and Generators," CDMA—Online, http://www.cdmaonline.com/members/workshops/terms1/1008.htm (1999).
Park et al., "A Novel Timing Estimation Method for OFDM Systems," IEEE Communications Letters, vol. 7, No. 5, pp. 239-241, Institute of Electrical and Electronics Engineers, New York, New York (May 2003).
Lee et al., "Rapid cell search in OFDM-based cellular systems," 2005 IEEE 61$^{st}$ Vehicular Technology Conference, vol. 2, pp. 1273-1277, Institute of Electrical and Electronics Engineers, New York, New York (May 30-Jun. 1, 2005).
Van Nee et al., "OFDM for Wireless Multimedia Communications," Artech House, London, United Kingdom (2000).
Zhang et al., "Joint frame Synchronization and Frequency Offset estimationin OFDM Systems," IEEE Transactions on Broadcasting, vol. 5, No. 3, pp. 389-394, Institute of Electrical and Electronics Engineers, New York, New York (Sep. 2005).
Schmidl et al., "Robust Frequency and Timing Synchronization for OFDM," IEEE Transactions on Communications, vol. 45, No. 12, pp. 1613-1621, Institute of Electrical and Electronics Engineers, New York, New York (Dec. 1997).
"Cell Search and Initial Acquisition for OFDM Downlink," 3GPP TSG RAN1#43, Seoul, Korea, R1-051329, 3rd Generation Partnership Project, Valbonne, France (Nov. 7-11, 2005).
Popovic, "Synthesis of Power Efficient Multitone Signals with Flat Amplitude Spectrum" IEEE Transactions on Communications, vol. 39, No. 7, pp. 1031-1033, Institute of Electrical and Electronics Engineers, New York, New York (Jul. 1991).
Popovic, "Generalized Chirp-Like Polyphase Sequences with Optimum Correlation Properties," IEEE Transactions on Information Theory, vol. 38, No. 4, pp. 1406-1409, Institute of Electrical and Electronics Engineers, New York, New York (Jul. 1992).
Popovic, "Efficient Golay Correlator," Electronic Letters, vol. 35, No. 17, pp. 1427-1428 Institute of Engineering and Technology, Stevenage, United Kingdom (Aug. 19, 1999).

(56) References Cited

OTHER PUBLICATIONS

"Cell Search procedure for initial synchronization and neighbour cell identification," 3GPP TSG RAN WG1 Meeting #43, Seoul, Korea, R1-051412, 3rd Generation Partnership Project, Valbonne, France (Nov. 7-11, 2005).
U.S. Appl. No. 13/365,889, (Feb. 3, 2012).
U.S. Appl. No. 13/365,957, (Feb. 3, 2012).
Office Action in corresponding U.S. Appl. No. 12/175,632 (Mar. 25, 2011).
Office Action in corresponding U.S. Appl. No. 13/365,889 (Sep. 27, 2013).
Office Action in corresponding U.S. Appl. No. 13/365,957 (Sep. 19, 2013).
Office Action in corresponding U.S. Appl. No. 13/365,957 (Dec. 11, 2014).

* cited by examiner

METHOD FOR IMPROVING SYNCHRONIZATION AND INFORMATION TRANSMISSION IN A COMMUNICATION SYSTEM

CROSS-REFERENCE TO RELATED APPLICATIONS

This application is a continuation of U.S. patent application Ser. No. 13/365,957, filed on Feb. 3, 2012, which is a continuation of U.S. patent application Ser. No. 12/175,632, filed on Jul. 18, 2008, which is a continuation of International Patent Application No. PCT/CN2006/000076, filed on Jan. 18, 2006, all of which is hereby incorporated by reference in their entireties.

TECHNICAL FIELD

The present invention relates to a method for synchronization and information transmission in a communication system, and more particularly to a radio communication system, a transmitter unit and a receiver unit.

BACKGROUND

Several different proposals for the EUTRA synchronization channel (SCH), intended for use in the cell search procedure are proposed in $3^{rd}$ Generation Partnership Project RAN1 until now. For instance: Motorola, "Cell Search and Initial Acquisition for OFDM Downlink," R1-051329, Seoul, Korea, Nov. 7-11, 2005 (this paper is called Moto hereinafter).

Compared to the solution existing in the WCDMA standard, Motorola's proposal makes a step forward towards concurrent initial timing acquisition and cell identification. In this way the duration of overall cell search procedure, resulting in timing acquisition and cell identification, is supposed to be shortened.

According to this proposal, the synchronization channel consists of two concatenated identical cell-specific OFDM waveforms, which are preceded by a cyclic prefix of $L_{CP}$ samples. Such SCH is designed to support the initial timing acquisition by using blind differential correlation detection in the receiver, see: T. M. Schmidl and D. C. Cox, "Robust Frequency and Timing Synchronization for OFDM," IEEE Trans. On Communications, Vol. 45, pp. 1613-1621, December 1997 (this paper is called T. M. Schmidl hereinafter).

The cell identification is performed after the initial timing acquisition, by detecting the cell specific OFDM waveform obtained by modulating the sub-carriers with the elements of a cell-specific Zadoff-Chu sequence of prime length (the Zadoff-Chu sequences are the basis for the generation of a much broader family of so-called GCL sequences, see: B. M. Popovic, "Generalized chirp-like polyphase sequences with optimum correlation properties," IEEE Trans. On Information Theory, vol. 38, pp. 1406-1409, July 1992. The cell-specific index of the GCL sequence can be detected by using an Inverse Discrete Fourier Transform (IDFT), after the differential encoding of the block of the received signal samples.

Although the above solution for the synchronization channel seems quite promising in terms of reduced overall cell search time, still its timing acquisition is very sensitive to noise/interference due to the broad triangular shape of the differential correlation function.

The SCH signal from Moto consists of a cyclic prefix followed by a synchronization signal s(k), k=0, 1, . . . , N−1, consisting of twice repeated basic cell-specific OFDM waveform W(l), l=0, 1, . . . , N/2−1, where N is the number of samples in the OFDM signal obtained after the IDFT in the transmitter. The timing of the SCH can be detected in the receiver by the following algorithm:

A) Take a block of N received signal samples;
B) Correlate the first N/2 samples of the block with the complex conjugate of the last N/2 samples of the block, and store the resulting differential correlation;
C) Repeat the first two steps for a new block of N samples of the received signal, taken after a delay of one sample compared to the previous block;
D) Find the delay of the block of N samples that result in the maximum correlation magnitude, and select it as the initial timing for OFDM symbol demodulation.

The differential correlation C(p) of the received signal r(k), k=0, 1, . . . , N−1, can be mathematically represented as $$C(p) = \sum_{k=0}^{N/2-1} r(p+k) \cdot r^*(p+k+N/2), \quad (1)$$

where p denotes the delay of the first sample in the block of N received samples with respect to the true position of the first sample of the synchronization signal, and "*" denotes complex conjugation. If the received signal contains just the repeated waveform W(k) (without the cyclic prefix), then it follows that the differential correlation of the received signal is equal to the differential correlation function $C_W(p)$ of the waveform W(k), which exists only for p=0, ±1, ±2, . . . , ±(N/2−1), N is even, and is given by $$C_W(p) = \sum_{k=0}^{N/2-1-|p|} W(k) \cdot W^*(k) = \sum_{k=0}^{N/2-1-|p|} |W(k)|^2, \quad (2)$$

$$p = 0, \pm 1, \pm 2, \ldots \pm (N/2-1).$$

The differential correlation function of the synchronization signal from Moto, generated by IFFT of N=128 samples, with cyclic prefix of 10 samples, is shown in FIG. 1.

The formula (2) explains the broad triangular-like shape of the differential correlation function in FIG. 1. Small distortions of the triangular shape come from the fluctuations of the signal envelope. Thus, it can be seen from (2) that the differential correlation depends just on the envelope of synchronization signal, so the different synchronization signals with the constant envelope will produce the same differential correlation. The differential correlation function in FIG. 1 reaches a plateau which has a length equal to the length of the cyclic prefix (T. M. Schmidl).

The peak detection of the differential correlation can be done, for example by finding the maximum of the correlation function calculated in a (10 ms) frame of the received samples. However, there might be synchronization signals from multiple cells that can be received concurrently in the user equipment (UE), and all of them should be detected in the cell search procedure. Consequently, the peak detection of the differential correlation in a frame of received samples is not enough, because it cannot discriminate the peaks coming from the different cells.

Instead, or additionally, some kind of threshold-based selection has to be applied. For example, the magnitude of each differential correlation value can be compared with an adaptive threshold proportional to the energy of the signal in the correlation window of N/2 samples used to calculate the observed correlation value, so all the correlation values larger than a certain percentage of the signal energy in the corresponding correlation window will be selected for further processing by peak detection to find the accurate time of arrival of each synchronization signal.

The comparison with the above adaptive threshold is equivalent to comparing the normalized differential correlation as defined in T. M. Schmidl, eq. (8) (normalized with the received energy in the second half-symbol) with a fixed threshold between 0 and 1. As the timing acquisition performances are basically determined by the properties of differential correlation, we shall not discuss further normalization with the signal energy.

An impulse-like differential correlation function is obtained by the OFDM synchronization signal proposed in B. Park et al, "A Novel Timing Estimation Method for OFDM Systems", IEEE Communications Letters, Vol. 7, No. 5, pp. 239-241, May 2003 (this paper is called B. Park hereinafter), eq. (10) as $$s(k)=[W(k)Z(k)W^*(k)Z^*(k)], \quad (3)$$

where the waveform W(k) of length N/4 samples is generated by IFFT of a pseudo-noise sequence, while the waveform Z(k) is designed to be symmetric with W(k). The synchronization signal (3) is detected by a modified differential correlation, defined as (B. Park)

$$D(p) = \sum_{k=0}^{N/2-1} r(p-k) \cdot r(p+k). \quad (4)$$

The signal (3) is explicitly and exclusively defined as an OFDM signal, to be generated by the IFFT, so the B. Park does not anticipate other types of centrally symmetric synchronization signals, such as spread-spectrum direct sequence signals.

If neglect the complex conjugation in the signal (3), a person skilled in the art can notice that it is basically a repetitive signal, whose basic repeated waveform of length N/2 samples is centrally symmetric. Such a signal has an impulse-like differential correlation function, but its repetitive structure results in high correlation sidelobes, equal always to the quarter of the signal energy, regardless of the properties of the pseudo-noise sequences used to modulate the sub-carriers within the OFDM signal. The high correlation sidelobes can cause an increased probability of false timing acquisition, so it is desirable to reduce them as much as possible.

Besides, the shorter length (N/2) of the basic waveform repeated in the synchronization signal (3) implies a smaller number of different synchronization signals that can be generated. In the application of interest, such as the cell search in a cellular system (which is not considered in B. Park), where the synchronization signals should not just serve for timing acquisition, but also for the information transmission, the smaller number of potential different synchronization signals with low cross-correlation implies a smaller amount information that can be conveyed by the synchronization signal.

Further on, the complex conjugation of the basic repeated waveform in the second half of the signal might complicate the implementation of the signal generator and demodulator, especially if the signal is supposed to be obtained by the IDFT of a complex pseudo-noise sequence.

Also, the synchronization signal (3) consists of two symmetric waveforms, so N/2 is an even number.

In the paper, Zhang et al. "Joint Frame Synchronization and Frequency Offset Estimation OFDM Systems" IEEE Trans. On Broadcasting, vol. 51, no 3, September 2005, is described a joint frame synchronization and carrier frequency offset estimation scheme. The paper seems mainly be concentrating on improving the frequency error estimation; it is not said how the arrival time of the training symbol should exactly be estimated.

SUMMARY

A method is provided which enables synchronization of a communication system with decreased sensitivity to noise/interference, and which also enables a simultaneous transfer of information.

Thus, according to an embodiment of the invention, a signal for improved synchronization and information transmission in a communication system is generated with a centrally symmetric part, s(k), the centrally symmetric part s(k) being symmetric in the shape of the absolute value thereof, wherein the centrally symmetric part s(k) is of arbitrary length N and is based on a uniquely identifiable sequence c(l) from a set of sequences.

The method of the present invention could be implemented through a transmitter unit and in a receiver unit in a communication system. Together they would form part of a radio communication system that would include at least one such transmitter unit and at least one such receiver unit.

The timing acquisition in the receiver is improved in applications where the synchronization signals transmitted to support and alleviate the timing acquisition in the receiver should also carry some information, such as transmitter's identification number, etc. One of such applications is cell search procedure in a cellular system. Besides, it allows an increased amount of information to be carried by the synchronization signals, compared to the prior art in Moto.

BRIEF DESCRIPTION OF THE DRAWINGS

Embodiments will now be described, with reference of the appended drawings, on which

DETAILED DESCRIPTION OF ILLUSTRATIVE EMBODIMENTS

Figure 1:
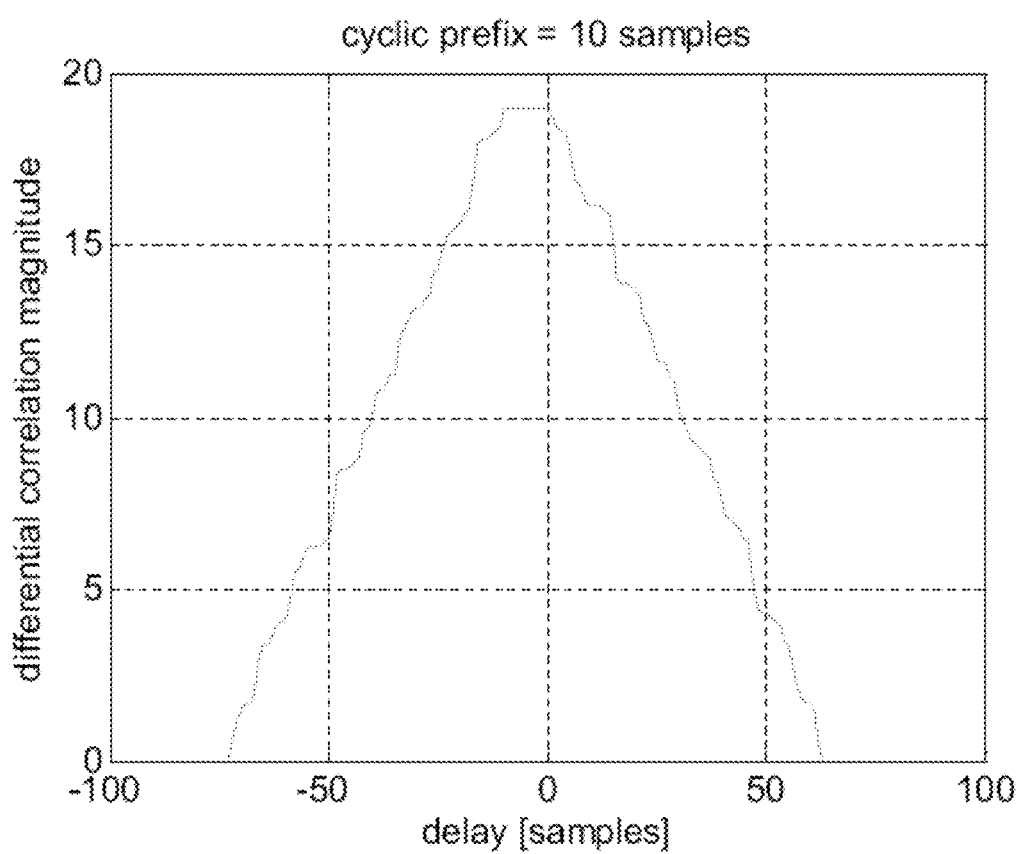
FIG. 1 illustrates a correlation function according to the prior art.

In order to achieve an impulse-like differential correlation function, embodiments of the present invention shall first modify the definition of the differential correlation so that as much as possible different products of samples are involved in the summations corresponding to the different delays. In this way the differential correlation values corresponding to different out-of-synchronization delays will be randomized.

One way to achieve the random out-of-sync differential correlation values is to reverse the order of samples in one of the blocks of samples used in (1). We shall define so-called reverse differential correlation D(p) as $$D(p) = \sum_{k=0}^{\lceil N/2 \rceil - 1} r(p+k) \cdot r^*(p+N-1-k), \quad (5)$$

where p denotes the delay of the first sample in the block of N received samples with respect to the true position of the first sample of the synchronization signal, and $\lceil x \rceil$ denotes the ceiling function of x, i.e. the smallest integer greater than or equal to x.

To obtain the maximum possible correlation value (5) at p=0, equal to the energy of the signal in the correlation window of $\lceil N/2 \rceil$ samples, the synchronization signal s(k), k=0, 1, . . . , N−1, should be centrally symmetric, i.e. such that $$s(k) = \begin{cases} s(N-1-k), & k = 0, 1, \ldots, N-1 \\ 0, & \text{elsewhere} \end{cases}, \quad (6)$$

where N is arbitrary positive integer, and where we assumed that the signal energy is equally distributed between the first and second block of $\lceil N/2 \rceil$ samples.

From (5) and (6) it follows that the reverse differential correlation $D_s(p)$ of the synchronization signal s(k) exists only for p=0, ±1, ±2, . . . , ±($\lceil N/2 \rceil$−1), and is given by $$\begin{aligned} D_s(p) &= D_s^*(-p) \\ &= \sum_{k=0}^{\lceil N/2 \rceil - 1} s(p+k) \cdot s^*(p+N-1-k) \\ &= \sum_{k=p}^{\lceil N/2 \rceil - 1} s(k+p) \cdot s^*(k-p) \\ &= \sum_{l=0}^{\lceil N/2 \rceil - 1 - p} s(l+2p) \cdot s^*(l), \ p = 0, 1, \ldots, \lceil N/2 \rceil - 1. \end{aligned} \quad (7)$$

The formula (7) resembles very much to the aperiodic autocorrelation function R(p) of the synchronization signal s(k), defined as $$R(p) = R^*(-p) = \sum_{l=0}^{N-1-p} s(l+p) \cdot s^*(l), \ p = 0, 1, \ldots N-1. \quad (8)$$

As it can be seen, the only difference between $D_s(p)$ and R(p) is in a reduced number of summation elements. Thus if the s(k) has an impulse-like aperiodic autocorrelation function, its reverse differential correlation function has very good chances to be impulse-like as well.

The equation (7) shows that, in general, the non-repetitive, but centrally symmetric pseudo-random signals produce lower correlation sidelobes than the repetitive signals.

An alternative to centrally symmetrical synchronization signals defined by (6) are such satisfying $$s(k) = \begin{cases} s^*(N-1-k), & k = 0, 1, \ldots, N-1 \\ 0, & \text{elsewhere} \end{cases}, \quad (9)$$

in which case the reverse differential correlation has to be re-defined as $$D(p) = \sum_{k=0}^{\lceil N/2 \rceil - 1} r(p+k) \cdot r^*(p+N-1-k). \quad (10)$$

The OFDM synchronization signal (3) proposed in the prior art, B. Park, eq. (10) can be viewed as a special case of signal (9). Note that (9) is more general because it is defined for arbitrary length N, while (3) is defined only for N=0 mod 4.

The same maximum absolute value of the reverse differential correlation can be obtained if the signal is skew-symmetric, i.e. defined as $$s(k) = \begin{cases} -s(N-1-k), & k = 0, 1, \ldots, N-1 \\ 0, & \text{elsewhere} \end{cases}. \quad (6.1)$$

Similarly, the absolute value of (10) will not change if the signal is defined as $$s(k) = \begin{cases} -s^*(N-1-k), & k = 0, 1, \ldots, N-1 \\ 0, & \text{elsewhere} \end{cases}. \quad (9.1)$$

Embodiment 1

To illustrate the design of centrally symmetric synchronization signals (6) and the properties of the corresponding reverse differential correlation functions (5), we shall generate the set of OFDM centrally symmetric synchronization signals starting from the assumptions given in Moto: the sampling frequency is 1.92 MHz, the sub-carrier spacing is 15 kHz, the maximum number of occupied sub-carriers is Nosc=76 out of totally N=128 sub-carriers within 1.92 MHz frequency band (the transmission bandwidth is 1.25 MHz). The occupied sub-carriers are modulated by the elements of a pseudo-random sequence from the set of sequences with good cross-correlation properties. The different sequences from the set are labelled by the different cell identification numbers (IDs). After the DFT demodulation of the received OFDM signal the transmitted sequence can be identified by de-mapping from the sub-carriers, followed by a certain signal processing. Low cross-correlation between sequences contributes to more reliable identification of the sequences when multiple signals are concurrently received from different cells.

The output OFDM synchronization signal s(k) of length N=128 samples is obtained by the IDFT of the spectrum H(n) of N=128 Fourier coefficients, as $$\begin{aligned} s(k) &= \frac{1}{N} \sum_{n=0}^{N-1} H(n) W_N^{-kn}, \\ W_N &= \exp(-j2\pi/N), \ j = \sqrt{-1}, \\ k &= 0, 1, 2, \cdots, N-1. \end{aligned} \quad (11)$$

If H(n)=H(N−n), n=0, 1, 2, . . . , N−1, where H(N)=H(0) holds according to the periodicity of the DFT, it can be shown that the s(k) will be also symmetric around its s(N/2) sample, i.e.

$s(k)=s(N-k)$, if and only if $H(n)=H(N-n)$, $k,n= 1,\ldots,N-1$. (12)

The proof of (12) follows: Starting from the definition of s(k) as $$s(k) = \frac{1}{N}\sum_{n=0}^{N-1} H(n)W_N^{-kn}, \quad (A1)$$
$$W_N = \exp(-j\pi/N), j = \sqrt{-1},$$
$$k = 0, 1, 2, \cdots, N-1.$$

it follows $$s(N-k) = \frac{1}{N}\sum_{n=0}^{N-1} H(n)W_N^{kn} \quad (A2)$$
$$= \frac{1}{N}\sum_{l=N}^{1} H(N-l)W_N^{-kl}$$
$$= \frac{1}{N}\sum_{n=0}^{N-1} H(N-l)W_N^{-kl}$$

$$k = 0, 1, 2, \cdots, N-1,$$

where we introduced the change of variables n=N−l, reordered the summation and used periodicity of the DFT (H(n)= H(n+N)). From (A.1) and (A.2) it follows that s(k)=s(N−k) if H(n)=H(N−n), what is a sufficient condition. It is also a necessary condition, meaning that only if H(n)=H(N−n) it will be s(k)=s(N−k), as it can be shown by starting from the expression for H(n).

The spectrum H(n) might be obtained by using the elements of a pseudo-random sequence c(l), l=0, 1, . . . , L−1, L≤Nosc, as the Fourier coefficients at the occupied sub-carrier frequencies.

If we define the mapping between c(l) and H(n) as $$H(n) = \quad (13)$$
$$\begin{cases} c\left(n + \frac{L-1}{2}\right), & n = 0, 1, 2, \cdots, \frac{L-1}{2} \\ c\left(n - N + \frac{L-1}{2}\right), & n = N - \frac{L-1}{2}, \cdots, N-1, \quad L \text{ is odd,} \\ 0, & n = \frac{L-1}{2} + 1, \cdots, N - \frac{L-1}{2} - 1 \end{cases}$$

where c(l), l=0, 1, . . . , L−1, is a centrally symmetric sequence of odd length L, it is obvious that condition in (12) will be satisfied.

Consequently, the resulting synchronization signal s(k), k=0, 1, 2, . . . , N−1, is a low-pass base-band OFDM signal symmetrical around its s(N/2) sample, meaning that only the sample s(0) does not have its symmetrical counterpart with respect to s(N/2). In other words, the resulting OFDM synchronization signal can be considered as consisting of two parts: the first part contains one sample and the second part contains N−1 centrally symmetric samples, such that s(k)=s(N−k), k=1, 2, . . . , N−1.

It further means that for the blind detection of the above OFDM signal we should use the blocks of N−1 input signal samples, and perform the reversed differential correlation as $$D(p) = \sum_{k=0}^{\lceil N/2 \rceil - 1} r(p+k+1) \cdot r^*(p+N-1-k). \quad (14)$$

However, the whole block of N samples should be used for OFDM demodulation, and subsequent identification of the information content (cell ID), once the correct timing is acquired.

The remaining question is which kind of centrally symmetric sequences of odd length L to choose for modulation of the sub-carriers. The L−1 pseudo-noise sequences $\{a_r(l)\}$, r=1, . . . , L−1, where L is a prime number, used in Moto to produce the repetitive OFDM synchronization signals are Zadoff-Chu (ZC) sequences of odd length L, defined as $$a_r(l) = W_L^{rl(l+1)/2}, l=0,1,\ldots,L-1, L \text{ is odd,} \quad (15)$$

where $W_L = \exp(-j2\pi/L)$, $j=\sqrt{-1}$.

If L is odd, it can be easily shown that the ZC sequence (15) is centrally symmetric (around its (L−1)/2+1-th element), i.e. $a_r(l)=a_r(L-1-l)$, l=0, 1, . . . , L−1. To accommodate the sequence length to be equal or less than the maximum number of occupied sub-carriers, we can discard a certain number sequence elements at the beginning and at the end of the ZC sequence so that the resulting shortened sequence remains centrally symmetrical.

As the maximum allowed number of occupied sub-carriers is Nosc=76, and the ZC sequence length should be a prime number, we shall use L=79 in (15) to generate a prototype ZC sequence, which is then shortened to length L=75 by discarding the first 2 and the last 2 elements of the prototype ZC sequence, so that the resulting shortened ZC sequence remains centrally symmetric. The shortened sequence is then used in (13) to produce the OFDM synchronization signal (11) after IDFT of H(n).

By choosing the different values of r in (15), we can obtain up to M=L−1=74 different OFDM synchronization signals, each carrying the different information about the cell ID. This number of cell IDs is almost twice larger than the number (41) of cell IDs in Moto for the same size of synchronization signals. In the same time, the principle of the detection of the ZC sequences from Moto, by using differential encoding and IDFT, can be applied also in the example at hand.

Figure 2:
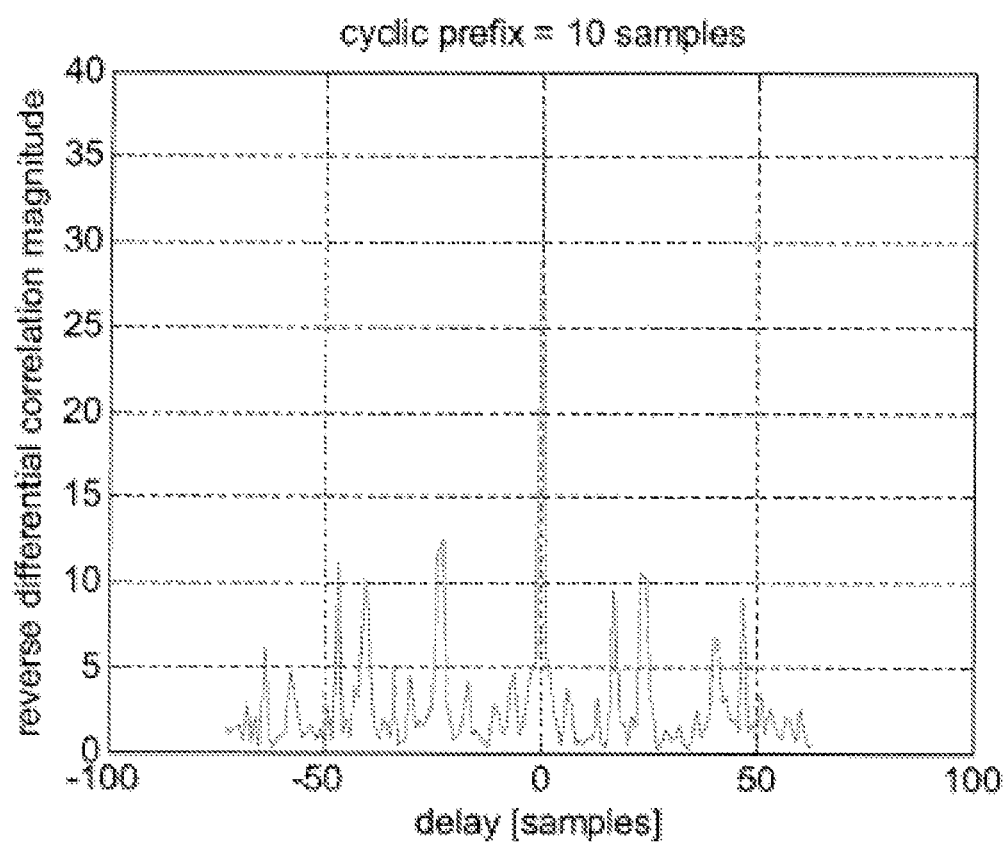
FIG. 2 illustrates a reverse correlation function.

To ensure the demodulation robustness in the case of multipath propagation channel, the OFDM synchronization signal is preceded by a cyclic prefix. The magnitude of the reverse differential correlation function of the OFDM synchronization signal (11) obtained from the shortened ZC sequence of length L=75, with the cell ID=r=29 and with the cyclic prefix of $L_{CP}=10$ samples, is shown in FIG. 2.

The cyclic prefix makes the reverse differential correlation function asymmetrical, with slightly increased sidelobe levels for the negative delays. However, as the sidelobe levels are still relatively low compared to the main peak, the probability of the false timing acquisition is not expected to be influenced by them.

The Zadoff-Chu sequences are the basis for the generation of the GCL sequences {c(l)}, defined as [6]

$$c(l) = a(l)b(l \bmod m), l=0,1,\ldots,L-1, \quad (16)$$

where $L=sm^2$, s and m are positive integers, {b(l)} is a sequence with m complex numbers of unit magnitude, and {a(l)} is a Zadoff-Chu sequence of length L. So, in order to obtain a centrally symmetric GCL sequence, L should be odd and the modulation sequence {b(l)} should be centrally symmetric. The centrally symmetric GCL sequences have a potential for more information transmission if used in the present invention, because of their larger number. Besides, they retain the optimum correlation properties independently of the selection of their modulation sequences.

Timing Acquisition Performances

In the user equipment (UE) in cellular systems the initial frequency error (immediately after power on) of the RF signal might be of the order of tens of thousands of Hz. This frequency error will be reduced within the limits of several hundreds of Hz once the receiver is locked to the received signal from a base station. The UE will be locked to a base station after the initial cell search, the task performed by the UE after it is switched on. Once the UE has found its "camping" cell, the cell search procedure enters the monitoring mode, where it monitors the available neighbouring cells, either for possible handover, if the UE is in active mode, or for possible cell re-selection (for better signal reception), if the UE is in the idle mode. In the monitoring mode the frequency error between the received signals and the UE's RF signal is significantly reduced because all the cells are tightly frequency synchronised and the UE is already synchronized to one of them.

Thus, during the initial cell search it should be possible to detect the time-of-arrival of the synchronization signals transmitted from the base station under relatively high frequency error in the receiver.

The timing acquisition performance of the synchronization signal from the Embodiment 1 is evaluated by simulation, in terms of probability of correct timing acquisition as a function of signal-to-noise ratio (SNR) on Additive White Gaussian Noise (AWGN) channel. The four values of the initial frequency error df between the UE and the base station are simulated: df=0, 1, 2 and 3 ppm at 2.6 GHz carrier frequency. The cyclic prefix is 10 samples long in all cases.

The timing acquisition is considered correct if the estimated time of arrival is within the error tolerance zone, which is positioned before the true timing position, so that it overlaps the cyclic prefix in the OFDM signal. The size of the error tolerance zone cannot be larger than the length of the cyclic prefix, and should be equal to the part of the cyclic prefix that is not covered by the channel response of the previous OFDM symbol. As the length of cyclic prefix should not be much longer (if at all) than the maximum expected length of the channel response, the error tolerance zone in practice cannot be longer than a few samples. However, as the repetitive synchronization signal from Moto is evaluated as the reference for comparison, we shall take the error tolerance zone to be equal to the cyclic prefix, in order to obtain the best performances for the signal from Moto.

Figure 3:
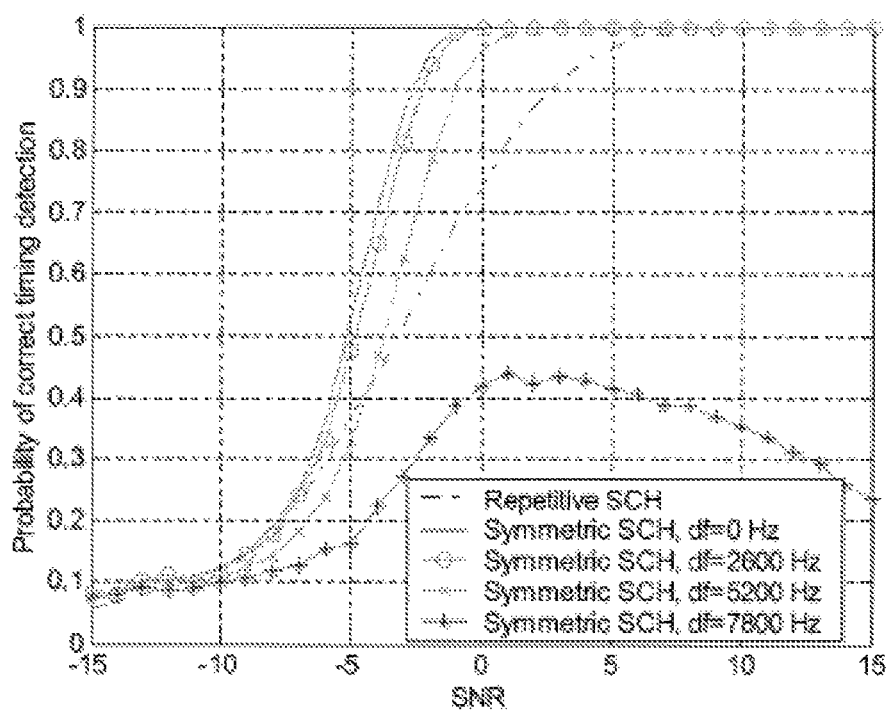
FIG. 3-FIG. 6 are graphs showing various probabilities for correct timing acquisition.

It can be easily known that the magnitude of the differential correlation does not depend on the frequency error, so the signal from Moto is evaluated with no frequency error. The results are shown in FIG. 3.

Without the initial frequency error, the centrally symmetric signal detected by the reverse differential correlation outperforms the repetitive signal detected by the differential correlation by more than 1 dB at 0.5 probability of correct acquisition, and more than 5 dB at 0.9 probability of correct acquisition.

For the non-zero values of the frequency error, the performance of the repetitive signal remains unchanged, while the performance of the centrally symmetric signal deteriorates with increase of the frequency error. At the frequency error of 1 ppm (2600 Hz), the relative performances remain almost unchanged. At the frequency error of 2 ppm, the centrally symmetric signal still remains better at probabilities of correct acquisition above 0.5, although the repetitive signal became better at very low SNRs. However, at the frequency error of 3 ppm the centrally symmetric signal fails to acquire the timing synchronization regardless of the SNR. This is because some of the sidelobes of the reverse differential correlation become higher than the main lobe, even without the presence of noise.

Embodiment 2

The timing acquisition performance results for the signals from Embodiment 1 has demonstrated that if the frequency error is above a certain threshold, the differential correlation produces better timing acquisition than the reverse differential correlation, while below a certain frequency error it is opposite.

This result suggests that if the frequency error during the initial cell search is above 2 ppm, it would be beneficial that the synchronization signal is both centrally symmetric and periodic. Such a signal could be detected in the UE both by the differential correlation and the reverse differential correlation, depending on UE's cell search mode, i.e. depending on the maximum expected frequency error in between the carrier frequency of received signal and the frequency of the reference RF signal in the receiver.

Thus, the initial cell search the synchronization signals transmitted from the base stations should be performed by using the differential correlation. Once the cell search enter the monitoring mode, the synchronization signals can be detected by the reverse differential correlation, which provide much better timing acquisition performances if the frequency error is low, allowing a faster detection of the neighbouring cells. It should be noted that in the cell search monitoring mode a quick detection of the neighbouring cells with better signal quality reduces the interference in the system because it allows UE to transmit will lower power.

Assuming the same conditions as in Embodiment 1, the set of centrally symmetric and periodic OFDM synchronization signals can be generated from the set of 36 ZC sequences of prime length L=37, by using the mapping (13), and IDFT (11), where N=64. The signal of length 64 samples obtained by (11) is then periodically extended, i.e. repeated to produce the final centrally symmetric and periodic synchronization signal of length 128 samples. As in the previous example, in the resulting signal s(k) of length N=128 samples, only the sample s(0) does not have its symmetrical counterpart with respect to s(N/2).

The same signal can be obtained directly (without periodic extension) by using (11) and the following general mapping $$H(n) = \begin{cases} c\left(\frac{n}{R} + \frac{L-1}{2}\right), & n = 0, R, 2R, \cdots, \left(\frac{L-1}{2}\right)R \\ c\left(\frac{n-N}{R} + \frac{L-1}{2}\right), & n = N - \left(\frac{L-1}{2}\right)R, \\ & N - \left(\frac{L-3}{2}\right)R, \cdots, N-R, \\ 0, & \text{elsewhere} \end{cases} \quad L \text{ is odd} \tag{17}$$

where $c(l), l=0, 1, \ldots, L-1$, is a centrally symmetric sequence of odd length L, R=2 is the number of repetitions, i.e. periods of a certain basic waveform within the signal, and N=128 is the IFFT size. In general, the mapping (17) produce a centrally symmetric signal with R periods if N mod R=0.

The timing acquisition performance of the above synchronization signal is evaluated by simulation, in terms of probability of correct timing acquisition as a function of signal-to-noise ratio (SNR) on Additive White Gaussian Noise (AWGN) channel. The four values of the initial frequency error df between the UE and the base station are simulated: df=0, 1, 2 and 3 ppm at 2.6 GHz carrier frequency. The cyclic prefix is 10 samples long in all cases. The results are shown in FIG. 4.

Figure 4:
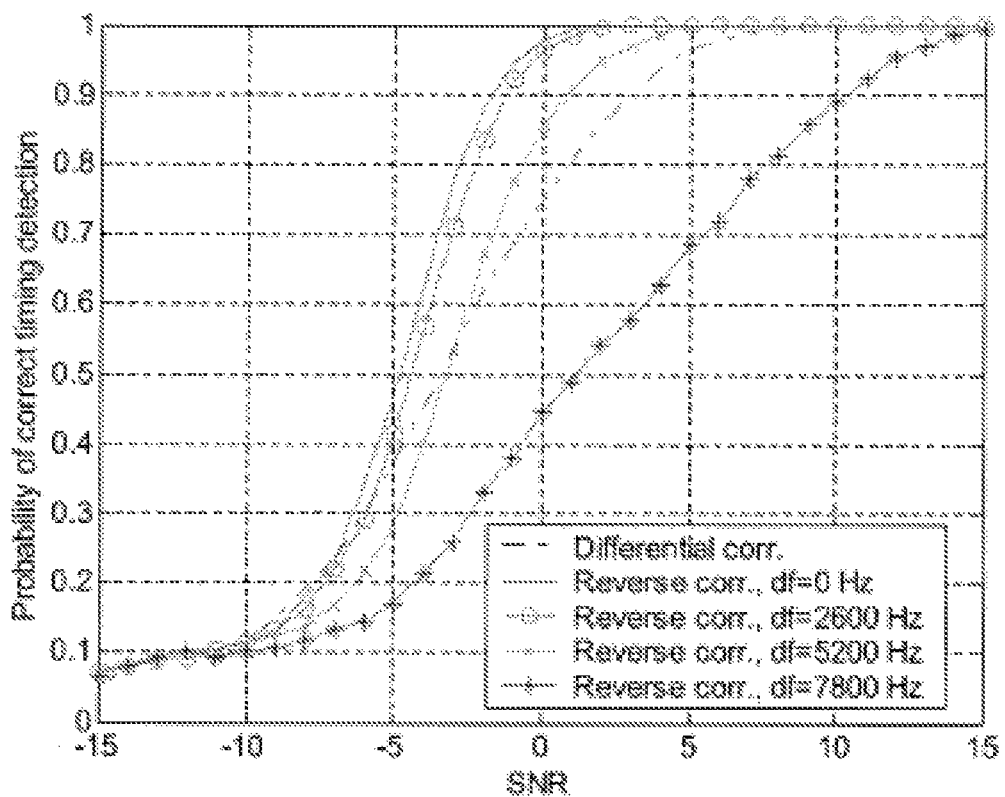

From FIG. 3 and FIG. 4 it can be seen that the reverse differential correlation of centrally symmetric and periodic OFDM signal is more robust to the frequency error of 3 ppm than the reverse differential correlation function of the non-periodic OFDM signal. Starting from the similarity between the formulas (7) and (8), the explanation of the different timing acquisition performances in FIG. 3 and FIG. 4 can be derived from the properties of the generalized aperiodic autocorrelation functions of the corresponding signals, widely known as the ambiguity function. This function is a two-dimensional function of the delay and the frequency error.

It is well known that the chirp-like signals, such as the non-repetitive signal from FIG. 3, has the ridge-type ambiguity function, distinguished by a shifted, non-zero delay position of its main lob at a high frequency error. This effect is the major reasons for the collapse of the reverse differential correlation at 3 ppm frequency error. The signals with some other cell IDs might be a bit less sensitive to this effect and might converge to probability of acquisition equal to 1 at higher SNRs, but they will also collapse at a bit higher frequency errors.

On the other side, the periodic signals, such as the one from FIG. 4, have so-called bed-of-nails type ambiguity functions, distinguished by rather high sidelobes regularly placed in the time-frequency plane, but the position of the main lobe, corresponding to the zero delay is unchanged with the frequency. Basically, these signals behave as virtually having the shorter length, what results in less distortion at high frequency error. On the other side, the high sidelobes of the reverse differential correlation come from the repetitive nature of the signal, so that even when there is no frequency error, the signal consisting of two periods of the same basic waveform has the reverse differential correlation sidelobes equal at least to the half of the main lobe. This results in a loss of acquisition performances for low frequency errors (bellow 2 ppm), as it can be noticed by comparing the FIG. 3 and FIG. 4.

Embodiment 3

Figure 5:
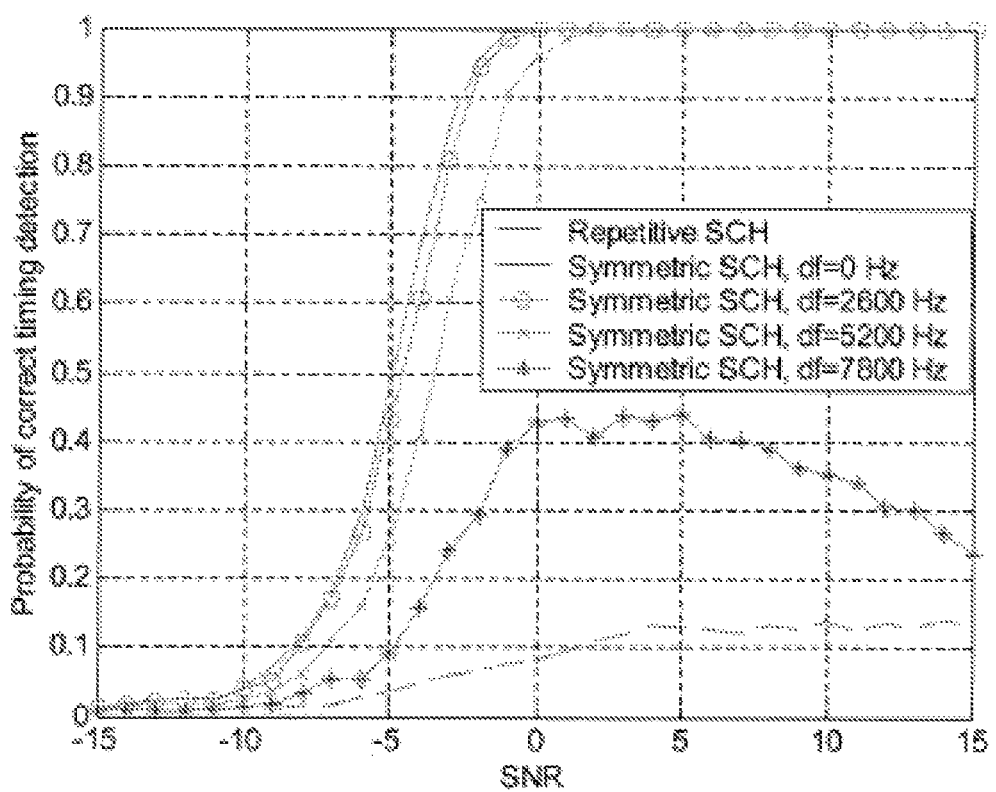

As abovementioned, the error tolerance zone in practice cannot be longer than a few samples. In that case, however, even the differential correlation (used to detect the repetitive synchronization signal from Moto) shows rather bad performances at high frequency errors, as it can be seen in FIG. 5, where the timing acquisition performances of the signals from FIG. 3 are evaluated with the tolerance zone of 2 samples.

The reason for bad performances of the differential correlation lies in the plateau shown in FIG. 1, which makes it highly probable that the noise will produce a correlation peak at the delay within the correlation plateau less than the zero (correct) delay. Thus, the curve corresponding to repetitive signal converges very slowly to the value 1 with an increase of SNR.

The previous discussion about the different types of the ambiguity functions leads to consideration of other types of the pseudo-noise sequences, with ambiguity functions more tolerant to frequency errors. Such pseudo-noise sequences are, for example, the sets of orthogonal Golay (binary) complementary sequences, see M. J. E. Golay, "Complementary Series", IRE Transactions on Information Theory, Vol. IT-7, pp. 82-87, April 1961 (this paper is called Document 8 hereinafter). The pairs of complementary Golay sequences exist for even sequence lengths L, and are distinguished by the property that the sum of the aperiodic autocorrelation functions of the sequences equals zero for all non-zero delays. A set of orthogonal Golay sequences of length L can be obtained by the bit-wise multiplication of a single Golay complementary sequence of length L with all L Walsh sequences of length L [Document 8]. The sequences within such a set can be grouped into L/2 different complementary pairs.

If the bits of a Golay sequence from the set of orthogonal Golay complementary pairs are used as the Fourier coefficients H(n) in (11), the resulting OFDM synchronization signal s(k) is similar to (9) and has the property:

$$s(k) = \begin{cases} s^*(N-k), & k = 0, 1, \cdots, N-1 \\ 0, & \text{elsewhere} \end{cases} \quad (18)$$

Such a signal can be detected by a modified reversed differential correlation (10), as $$D(p) = \sum_{k=0}^{\lceil N/2 \rceil - 1} r(p+k+1) \cdot r(p+N-1-k). \quad (19)$$

It can be easily known that the magnitudes of the reversed differential correlations (10) and (19) remain unchanged under arbitrary frequency error in the signal received over a single-path propagation channel. This is a general property that is valid for arbitrary signals (9), (9.1) and (18).

If the elements of a Golay sequence c(k) are mapped as the Fourier coefficients of the equidistant consecutive sub-carriers, for example as $$H(n) = \begin{cases} c(n + L/2), & n = 0, 1, 2, \cdots, L/2 - 1 \\ c(n - N + L/2), & n = N - L/2, \cdots, N - 1, \; L \text{ is even,} \\ 0, & \text{elsewhere} \end{cases} \quad (20)$$

the resulting OFDM signal has the peak-to-average power ratio less than 3 dB, see B. M. Popovic, "Synthesis of Power Efficient Multitone Signals with Flat Amplitude Spectrum", IEEE Transactions on Communications, Vol. 39, No. 7, pp. 1031-1033, July 1991. It further means that all the OFDM synchronization signals, based on different Golay sequences from a set of orthogonal complementary pairs will have a small PAPR values, allowing in that way the maximization of the average transmitted power, i.e. the maximization of the received SNR at the cell edge.

Figure 6:
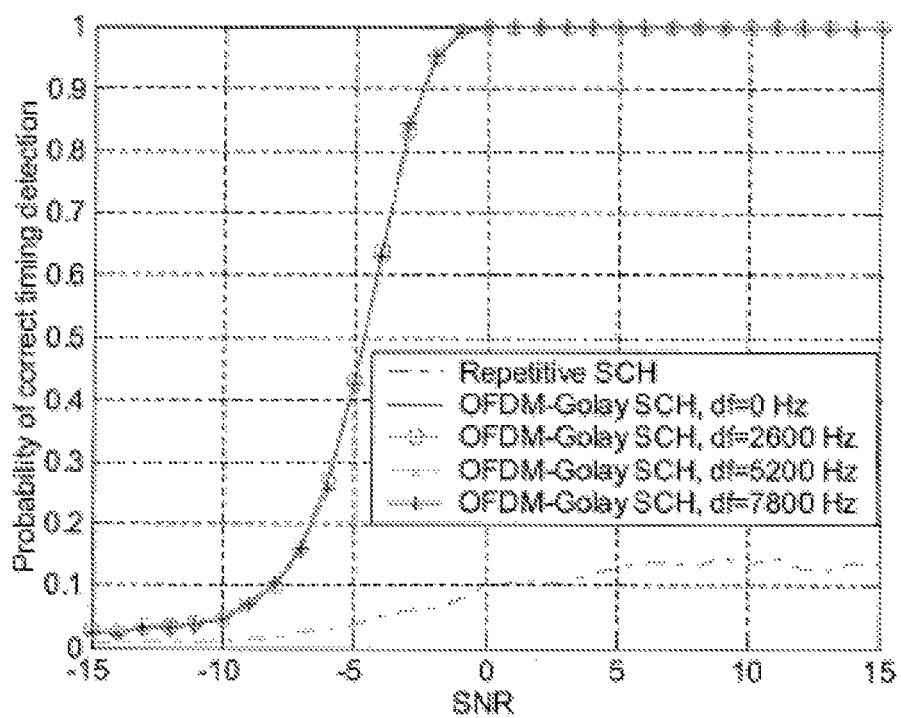

The timing acquisition performances of an OFDM signal obtained from a Golay complementary sequence of length L=64 mapped according to (20) and (11) into an OFDM signal of length N=128, are shown in FIG. 6. It can be seen that the timing acquisition performances of the OFDM signal obtained from a Golay complementary sequence do not change with the increase of the frequency error.

Information embedding in this scenario can for instance be accomplished by labelling each of the orthogonal Golay sequences in the present set. After receiving the signal and demodulating the data from the OFDM signal, the specific sequence could be identified by correlating with all sequences in the present set. Such a bank of correlators can be efficiently implemented, for example, by using the fast Hadamard transformation. Differential encoding might be applied to the demodulated sequence before correlation to remove the channel distortion. In that case the reference sequences used for correlation should be also differentially encoded.

Figure 7:
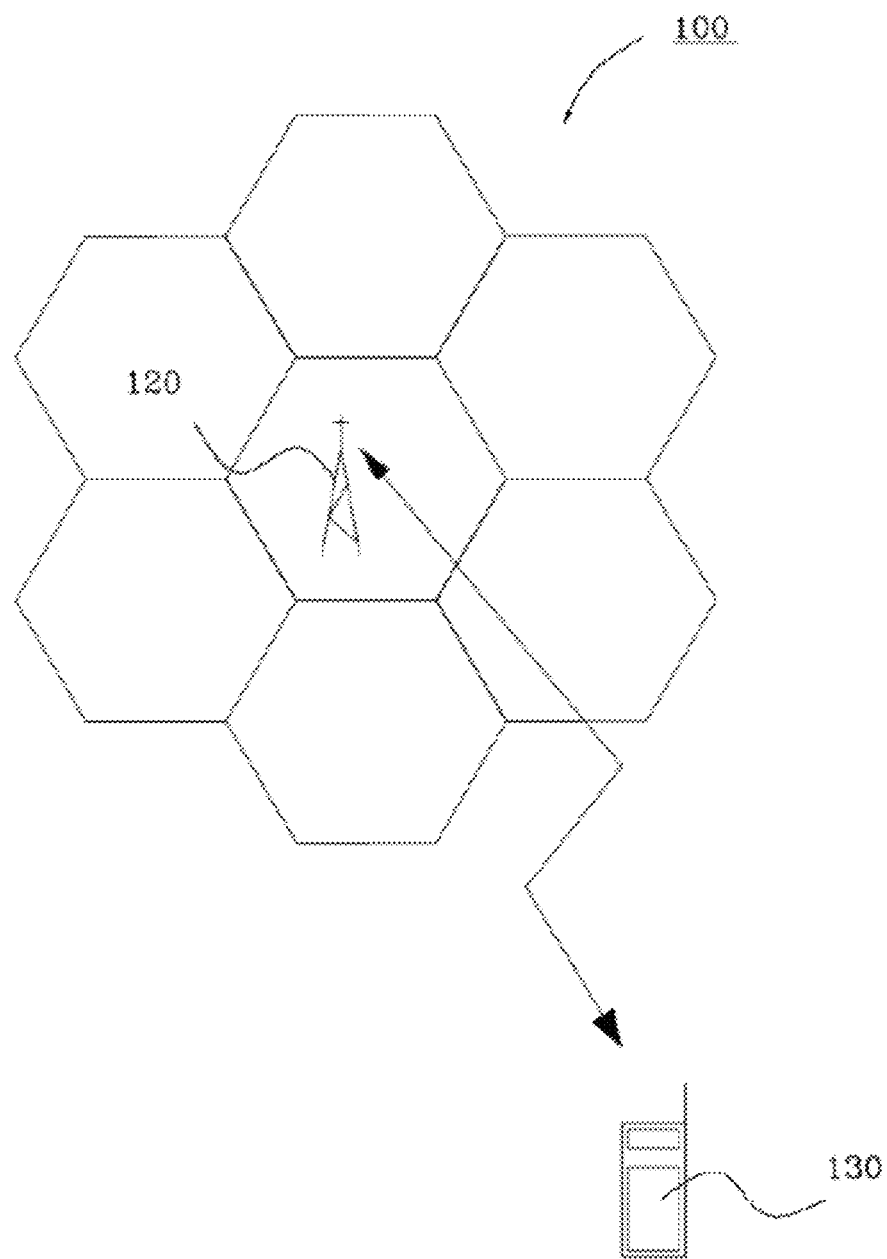
FIG. 7 illustrates a radio communication system according to an embodiment of the present invention.

Now with reference to FIG. 7, an embodiment of the present invention also provides a radio communication system, which for instance could consist of base station(s) 120 of a cellular system 100 and terminal(s) 130 communicating with the base station(s). The base station(s) and/or terminal(s) would include at least one transmitter unit with means for generating and sending a signal with a centrally symmetric part, s(k), wherein the centrally symmetric part s(k) is of arbitrary length N. The base station(s) and/or terminal(s) would also include at least one receiver unit including means for receiving and processing signals generated by the transmitter unit.

Applications and Alternatives

The present invention can be used in all applications where synchronization signals are transmitted to support and alleviate timing acquisition in a receiver and also when the signals are carrying some information, such as a transmitter's identification number, etc. One of such applications is cell search procedure in the cellular systems.

The proposed centrally symmetric synchronization signals can be of OFDM type, which brings certain benefits for the demodulation of the information from the signal which has passed multi-path (time-dispersive) propagation channel.

However, the noise-like centrally symmetric synchronization signals of other types, such as direct-sequence spread-spectrum signals, detected by the reverse differential correlation, can also be deployed with the similar timing acquisition performances.

What is claimed is:

1. A communication system, comprising: a receiver which is in communication with a transmitter,
   wherein the receiver is configured to receive a signal with a centrally symmetric part s(k) exploitable for synchronization from the transmitter;
   wherein the signal is based on a uniquely identifiable sequence c(l) from a set of sequences exploitable for information transmission, the centrally symmetric part s(k) is centrally symmetric in the shape of absolute value thereof, and the centrally symmetric part s(k) is of an arbitrary length N; and
   wherein the centrally symmetric part s(k) is obtained as an inverse discrete Fourier transform (IDFT) of a spectrum H(n) of N sub-carrier weights,
   the spectrum H(n) being generated by using elements of the sequence c(l), l=0, 1, . . . , L−1, L≤$N_{osc}$, as Fourier coefficients at occupied sub-carrier frequencies,
   $N_{osc}$ being a maximum number of occupied sub-carriers,
   H(n)=H(N−n), n=0, 1, 2, . . . , N−1, where H(N)=H(0) holds according to the periodicity of a discrete Fourier transform (DFT).

2. The communication system according to claim 1, wherein the signal is based on a sequence c(l) exploitable for information transmission from the transmitter to the receiver, the sequence c(l) is a Zadoff-Chu sequence defined as c(l)= $W_L^{rl(l+1)/2}$, l=0, 1, . . . , L−1, L is odd, where $W_L$=exp(−j2π/L), j=$\sqrt{-1}$, and the sequence c(l) is mapped to a cell identification number.

3. The communication system according to claim 1, wherein elements of the sequence c(l) are used for modulating sub-carriers occupied by the signal.

4. The communication system according to claim 1, wherein the centrally symmetric part s(k) is one of the following:

$$s(k) = \begin{cases} s(N-1-k), & k=0,1,\cdots,N-1 \\ 0, & \text{elsewhere} \end{cases},$$

$$s(k) = \begin{cases} s^*(N-1-k), & k=0,1,\cdots,N-1 \\ 0, & \text{elsewhere} \end{cases},$$

$$s(k) = \begin{cases} -s(N-1-k), & k=0,1,\cdots,N-1 \\ 0, & \text{elsewhere} \end{cases},$$

$$s(k) = \begin{cases} -s^*(N-1-k), & k=0,1,\cdots,N-1 \\ 0, & \text{elsewhere} \end{cases},$$

$$s(k) = \begin{cases} s(N-k), & k=1,\cdots,N-1 \\ 0, & \text{elsewhere} \end{cases},$$

$$s(k) = \begin{cases} s^*(N-k), & k=1,\cdots,N-1 \\ 0, & \text{elsewhere} \end{cases},$$

$$s(k) = \begin{cases} -s(N-k), & k=1,\cdots,N-1 \\ 0, & \text{elsewhere} \end{cases}, \text{ and}$$

$$s(k) = \begin{cases} -s^*(N-k), & k=1,\cdots,N-1 \\ 0, & \text{elsewhere} \end{cases}.$$

5. The communication system according to claim 1, wherein the centrally symmetric part s(k) is preceded by a cyclic prefix of $L_{CP}$ samples being identical to the last $L_{CP}$ samples of the centrally symmetric part s(k).

6. The communication system according to claim 1, wherein the sequence c(l) is mapped on to the spectrum H(n) as $$H(n) = \begin{cases} c\left(n + \frac{L-1}{2}\right), & n=0,1,2,\cdots,\frac{L-1}{2} \\ c\left(n - N + \frac{L-1}{2}\right), & n=N-\frac{L-1}{2},\cdots,N-1, \\ 0, & n=\frac{L-1}{2}+1,\cdots,N-\frac{L-1}{2}-1 \end{cases}.$$

7. The communication system according to claim 1, wherein the sequence c(l) is mapped on to the spectrum H(n) as $$H(n) = \begin{cases} c\left(\frac{n}{R} + \frac{L-1}{2}\right), & n=0,R,2R,\cdots,\left(\frac{L-1}{2}\right)R \\ c\left(\frac{n-N}{R} + \frac{L-1}{2}\right), & n=N-\left(\frac{L-1}{2}\right)R, \\ & N-\left(\frac{L-3}{2}\right)R,\cdots,N-R, \\ 0, & \text{elsewhere} \end{cases},$$

where R is the number of periods of a certain basic waveform within the signal, such that N mod R=0.

8. The communication system according to claim 1, the receiver is further configured to:
   calculate and store a reverse differential correlation D(p) from a block of N samples of the signal,
   repeat, a number of times, the calculate and store step for a new block of N samples of the signal, taken after a delay of one sample compared to the previous block, find the delay of the block of N samples that result in a maximum correlation magnitude, select such a delay as the initial timing for demodulation, and detect the unique sequence c(l) from the set of sequences.

9. A method of synchronization in a communication system, comprising:

receiving, by a receiver, a signal with a centrally symmetric part s(k) exploitable for synchronization from a transmitter;

wherein the signal is based on a uniquely identifiable sequence c(l) from a set of sequences exploitable for information transmission, the centrally symmetric part s(k) is centrally symmetric in the shape of absolute value thereof, and the centrally symmetric part s(k) is of an arbitrary length N;

wherein the centrally symmetric part s(k) is obtained as an inverse discrete Fourier transform (IDFT) of a spectrum H(n) of N sub-carrier weights, the spectrum H(n) being generated by using elements of the sequence c(l), l=0, 1, ..., L−1, L≤$N_{osc}$, as Fourier coefficients at occupied sub-carrier frequencies, $N_{osc}$ being a maximum number of occupied sub-carriers, H(n)=H(N−n), n=0, 1, 2, ..., N−1, where H(N)=H(0) holds according to the periodicity of a discrete Fourier transform (DFT).

10. The method according to claim 9, wherein the signal is based on a sequence c(l) exploitable for information transmission from the transmitter to the receiver, the sequence c(l) is a Zadoff-Chu sequence defined as c(l)=$W_L^{rl(l+1)/2}$, l=0, 1, ..., L−1, L is odd, where $W_L$=exp(−j2π/L), j=$\sqrt{-1}$, and the sequence c(l) is mapped to a cell identification number.

11. The method according to claim 9, wherein elements of the sequence c(l) are used for modulating sub-carriers occupied by the signal.

12. The method according to claim 9, wherein the centrally symmetric part s(k) is one of the following:

$$s(k) = \begin{cases} s(N-1-k), & k=0,1,\cdots,N-1 \\ 0, & \text{elsewhere} \end{cases},$$

$$s(k) = \begin{cases} s^*(N-1-k), & k=0,1,\cdots,N-1 \\ 0, & \text{elsewhere} \end{cases},$$

$$s(k) = \begin{cases} -s(N-1-k), & k=0,1,\cdots,N-1 \\ 0, & \text{elsewhere} \end{cases},$$

$$s(k) = \begin{cases} -s^*(N-1-k), & k=0,1,\cdots,N-1 \\ 0, & \text{elsewhere} \end{cases},$$

$$s(k) = \begin{cases} s(N-k), & k=1,\cdots,N-1 \\ 0, & \text{elsewhere} \end{cases},$$

$$s(k) = \begin{cases} s^*(N-k), & k=1,\cdots,N-1 \\ 0, & \text{elsewhere} \end{cases},$$

$$s(k) = \begin{cases} -s(N-k), & k=1,\cdots,N-1 \\ 0, & \text{elsewhere} \end{cases}, \text{ and}$$

$$s(k) = \begin{cases} -s^*(N-k), & k=1,\cdots,N-1 \\ 0, & \text{elsewhere} \end{cases}.$$

13. The method according to claim 9, wherein the centrally symmetric part s(k) is preceded by a cyclic prefix of $L_{CP}$ samples being identical to the last $L_{CP}$ samples of the centrally symmetric part s(k).

14. The method according to claim 9, wherein the sequence c(l) is mapped on to the spectrum H(n) as $$H(n) = \begin{cases} c\left(n + \frac{L-1}{2}\right), & n = 0, 1, 2, \cdots, \frac{L-1}{2} \\ c\left(n - N + \frac{L-1}{2}\right), & n = N - \frac{L-1}{2}, \cdots, N-1, \\ 0, & n = \frac{L-1}{2} + 1, \cdots, N - \frac{L-1}{2} - 1 \end{cases}.$$

15. The method according to claim 9, wherein the sequence c(l) is mapped on to the spectrum H(n) as $$H(n) = \begin{cases} c\left(\frac{n}{R} + \frac{L-1}{2}\right), & n = 0, R, 2R, \cdots, \left(\frac{L-1}{2}\right)R \\ c\left(\frac{n-N}{R} + \frac{L-1}{2}\right), & n = N - \left(\frac{L-1}{2}\right)R, N - \left(\frac{L-3}{2}\right)R, \cdots, N-R, \\ 0, & \text{elsewhere} \end{cases},$$

where R is the number of periods of a certain basic waveform within the signal, such that N mod R=0.

16. The method according to claim 9, further comprising:

calculating and storing a reverse differential correlation D(p) from a block of N samples of the signal;

repeating, a number of times, the calculating and storing for a new block of N samples of the signal, taken after a delay of one sample compared to the previous block;

finding the delay of the block of N samples that result in a maximum correlation magnitude;

selecting such a delay as the initial timing for demodulation; and detecting the unique sequence c(l) from the set of sequences.

* * * * *